(12) United States Patent
Molnar et al.

(10) Patent No.: US 10,619,655 B2
(45) Date of Patent: Apr. 14, 2020

(54) ELECTROPNEUMATIC VALVE ASSEMBLY (71) Applicant: HOERBIGER AUTOMATISIERUNGSTECHNIK HOLDING GMBH, Altenstadt (DE)

(72) Inventors: Györg Molnar, Waldenbuch (DE); Michael Kirn, Altensteig (DE); Benedikt Hildebrandt, Filderstadt (DE); Sebastian Neiss, Stuttgart (DE); Max Schrobenhauser, Peiting (DE); Daniel Haller, Stuttgart (DE); Jochen Schaible, Altensteig (DE); Manjeet Bilra, Tuttlingen (DE)

(73) Assignee: HOERBIGER AUTOMATSIERUNGSTECHNIK HOLDING GMBH, Altenstadt (DE)

( * ) Notice: Subject to any disclaimer, the term of this patent is extended or adjusted under 35 U.S.C. 154(b) by 0 days.

(21) Appl. No.: 16/158,559

(22) Filed: Oct. 12, 2018

(65) Prior Publication Data
US 2019/0040882 A1    Feb. 7, 2019

Related U.S. Application Data (63) Continuation of application No. PCT/EP2017/057915, filed on Apr. 4, 2017.

(30) Foreign Application Priority Data

Apr. 14, 2016  (DE) .......................... 10 2016 106 909

(51) Int. Cl.
F15B 21/00 (2006.01)
F15B 13/04 (2006.01)
(Continued)

(52) U.S. Cl.
CPC .......... F15B 21/003 (2013.01); F15B 11/076 (2013.01); F15B 13/0405 (2013.01);
(Continued)

(58) Field of Classification Search
CPC .. F15B 21/003; F15B 11/076; F15B 13/0889; F15B 13/0405; F15B 13/0431;
(Continued)

(56) References Cited

U.S. PATENT DOCUMENTS 3,573,409 A * 4/1971 Jeffrey ................. B60T 13/665
200/81.4
3,709,253 A * 1/1973 Spangenberg ........ F16K 31/423
137/595
(Continued)

FOREIGN PATENT DOCUMENTS

DE       25 27 330 A1    1/1977
DE       2826538 C2      5/1979
(Continued)

OTHER PUBLICATIONS

International Search Report and written opinion of the International Searching Authority issued for corresponding International Application No. PCT/EP2017/057915 dated Jun. 30, 2017, with English translation.

*Primary Examiner* — John Bastianelli
(74) *Attorney, Agent, or Firm* — Myers Wolin, LLC (57) ABSTRACT

An electropneumatic valve assembly comprises an electropneumatic pilot stage and a pneumatic power stage which is actuated by the pilot stage. Each pilot valve switches at least two power valves, and the valve assembly has a housing with an electrical signal input, with a compressed-air port, at least one vent port and at least one working outlet. The housing is layered with a pilot stage housing and a power stage housing connected along a substantially planar parting (Continued)

surface. At least one sealing element is between the pilot stage housing and power stage housing surrounding a control pressure region between the pilot stage housing and power stage housing. The control pressure region has two actuation regions for two power valves and has a duct-like connection with a defined flow cross section between the two actuation regions. An outlet of the associated pilot valve opens into the control pressure region.

16 Claims, 6 Drawing Sheets

(51) Int. Cl.
| | | |
|---|---|---|
| *F15B 13/043* | (2006.01) | |
| *F15B 13/08* | (2006.01) | |
| *F16K 27/00* | (2006.01) | |
| *F16K 31/42* | (2006.01) | |
| *F15B 11/076* | (2006.01) | |
| *F15B 13/00* | (2006.01) | |
| *F15B 11/06* | (2006.01) | |
| *F15B 11/00* | (2006.01) | |

(52) U.S. Cl.
CPC ........ *F15B 13/0431* (2013.01); *F15B 13/081* (2013.01); *F15B 13/0889* (2013.01); *F16K 27/003* (2013.01); *F16K 31/423* (2013.01); *F15B 11/006* (2013.01); *F15B 11/06* (2013.01); *F15B 13/0828* (2013.01); *F15B 2013/006* (2013.01); *F15B 2211/30575* (2013.01); *F15B 2211/71* (2013.01); *F15B 2211/8855* (2013.01); *Y10T 137/87201* (2015.04); *Y10T 137/87209* (2015.04)

(58) Field of Classification Search
CPC .... F15B 13/081; F15B 11/06; F15B 13/0828; F15B 11/006; F15B 2013/006; F15B 2211/30575; F15B 2211/8855; F15B 13/043; F15B 2211/71; F16K 27/003; F16K 31/423; Y10T 137/87209; Y10T 137/87201
USPC ...... 251/129.04, 331, 30.01–30.05; 137/884, 137/625.6, 625.63, 596.15, 596.16
See application file for complete search history.

(56) References Cited

U.S. PATENT DOCUMENTS

| | | | | |
|---|---|---|---|---|
| 3,714,868 | A * | 2/1973 | Kowalski | F15B 11/006 91/420 |
| 3,838,710 | A | 10/1974 | Reip | |
| 3,934,610 | A * | 1/1976 | Solie | F15B 13/04 137/596.12 |
| 4,210,310 | A | 7/1980 | Kay | |
| 4,469,128 | A * | 9/1984 | Petrimaux | F15B 13/0817 137/554 |
| 5,454,399 | A * | 10/1995 | Kazakis | B60T 8/00 137/596.16 |
| 6,176,438 | B1 * | 1/2001 | Sato | B05C 11/1026 222/571 |
| 6,398,181 | B1 * | 6/2002 | Dettmers | E21D 23/16 251/25 |
| 2015/0090352 | A1 * | 4/2015 | Nishimura | F16K 31/1262 137/485 |
| 2015/0177741 | A1 * | 6/2015 | Haller | F15B 11/006 137/596.15 |

FOREIGN PATENT DOCUMENTS

| | | |
|---|---|---|
| DE | 195 00 749 A1 | 7/1996 |
| EP | 1 133 651 B1 | 11/1999 |
| EP | 1 637 743 A2 | 3/2006 |
| EP | 2 113 696 B1 | 7/2011 |
| WO | 2004/027268 A1 | 4/2004 |

* cited by examiner

ELECTROPNEUMATIC VALVE ASSEMBLY

CROSS REFERENCE TO RELATED APPLICATIONS

This application is a continuation under 35 U.S.C. § 120 of International Application PCT/EP2017/057915, filed Apr. 4, 2017, which claims priority to German Application No. 10 2016 106 909.4, filed Apr. 14, 2016, the contents of each of which are incorporated by reference herein.

FIELD OF THE INVENTION

The present invention relates to an electropneumatic valve group, especially for actuation of a pneumatic working element, comprising an electropneumatic pilot stage with at least one pilot valve and a pneumatic power stage, activated by the pilot stage, with at least two power valves, wherein each pilot valve switches at least two power valves coupled pneumatically with the pilot valve and wherein the valve group is provided with a housing having an electrical signal input, a compressed-air port, at least one vent port and at least one working outlet.

BACKGROUND

Such electropneumatic valve groups are known in various configurations from the prior art and are used as position actuators (activated by means of an electronic actuating signal) for actuating a pneumatic working element to be connected to the at least one working outlet (e.g. a pneumatic fitting or a pneumatic drive).

Since two power valves are actuated simultaneously there by means of one pilot valve each, i.e. by means of the control pressure generated at an outlet of the pilot valve, it is to be ensured, by suitable configuration of the valve group or of the power valves, that the two power valves exhibit the desired switching behavior.

Electropneumatic valve groups of the type mentioned in the introduction and already known from the prior art frequently use, for pneumatic activation of the power valves, straight ducts produced as bores inside a metal housing with, pressed therein, flow restrictors, with which the time variation of the control pressure supplied to a particular power valve and thus the switching times of the respective power valves can be adapted to the specifically desired switching behavior. Hereby the adaptation of the switching behavior of the valve on the part of the manufacturer proves to be relatively complex in relationship to fabrication. Furthermore, on the basis of the long bores, which must receive a corresponding flow restrictor, a relatively large volume is needed for the control pressure to be generated for the pilot valve, which then in turn leads to longer switching times.

Furthermore, a valve device with layered structure, in which two activation regions provided for activation of two power valves via a rocker switch are separated from one another, is known from EP 1 133 651 B1.

Against the background of the prior art depicted in the foregoing, it is the object of the present disclosure to configure an electropneumatic valve group of the class type in question in such a way that it can be manufactured inexpensively and also be constructed modularly in such a way that it can be adapted as flexibly as possible in particularly simple manner to various customer-specific requirements.

SUMMARY

This object is achieved with an electropneumatic valve group according to the disclosure. Preferred configurations as well as the advantages of such a valve group will become apparent from the claims and the description hereinafter.

The pneumatic valve group is characterized not only by the features mentioned in the introduction but also in that the housing has layered structure with at least one pilot-stage housing and at least one power-stage housing connected thereto along a substantially plane separating face, wherein at least one sealing element, which encloses a control-pressure region disposed between pilot-stage housing and power-stage housing, is received or formed between the at least one pilot-stage housing and the at least one power-stage housing, wherein the control-pressure region is provided with two activation regions for two power valves and one duct-like connection with defined flow cross section between the two activation regions, and wherein an outlet of the associated pilot valve provided in the pilot-stage housing discharges into the control-pressure region.

By such a modular and layered structure of the housing of the valve group, in which the control-pressure region is formed between surfaces, turned toward one another, of the power-stage housing and of the pilot-stage housing, the switching times of the power valves can be influenced or matched to one another particularly simply.

In the present case, this can be achieved in particular by the fact that the flow cross section of the duct-like connection placing the two activation regions in communication is adapted to be suitable for the respective application situation. The outlet of the pilot valve discharging into the control-pressure region then does not have to receive any separate flow restrictors and can be designed—also by virtue of the layered structure of the housing of the valve group—as a simple bore with short length. The control air supplied by a pilot valve for switching of two power valves flows first to a suitably predeterminable point in the control-pressure region and there through the duct-like connection, which can be configured in diverse ways (e.g. with constrictions and/or deflections) between the two activation regions (each associated with a power valve).

Within the scope of the present disclosure, the flow-restriction effect needed to influence the switching times of the power valves may therefore be generated in particular by the specific shape and arrangement of the control-pressure region formed between pilot-stage housing and power-stage housing. In a valve group, various options exist for realizing, simply and inexpensively, the dimensioning of the flow cross section of the duct-like connection that fluidically couples the two activation regions of the control-pressure region, as will be explained in still more detail hereinafter.

In a first preferred configuration of the valve group, it may be provided that the outlet of the pilot valve discharges in asymmetric arrangement into the control-pressure region. For this purpose, it should be briefly explained once again that the control-pressure region in the present case comprises two activation regions (each associated with a power valve) and one duct-like connection between them, wherein a separate control-pressure region and two power valves to be activated thereby are associated with each pilot valve in the case of a valve group comprising more than one pilot valve. The concept of "asymmetric arrangement" mentioned in the foregoing relates to this control-pressure region, and so it is advantageous that the outlet of the pilot valve discharging into the control-pressure region does not discharge exactly centrally into the duct-like connection between the two activation regions. In particular, in an expedient configuration of the valve group, the outlet of the pilot valve in question discharges into one of the two activation regions of the control-pressure region associated with the pilot valve.

Particularly preferably, it may be provided within the scope of the present disclosure that the at least one sealing element is constructed as a closed cord seal, which laterally encircles the control-pressure region, which is bounded at the top and bottom by the pilot-stage housing and the power-stage housing (or a diaphragm/sealing face that if necessary bears thereon). Thus the sealing element is advantageously clamped sealingly between pilot-stage housing and power-stage housing, wherein a sealing element configured as a cord seal may be manufactured in particular as a separate part from a suitable elastomer (e.g. in an injection-molding process). The flow cross section of the duct-like connection bounded laterally by the sealing element may therefore be varied particularly simply by different configuration and/or different arrangement of the sealing element.

Furthermore, within the scope of the present disclosure, it may be advantageously provided that the surface of the pilot-stage housing turned toward the power-stage housing has grooves that receive the cord seal, wherewith it's positionally correct placement within the valve group can be assured in simple manner.

Preferably, it may be further provided that elevations are formed on the surface of the pilot-stage housing turned toward the power-stage housing, especially between two grooves adjacent to one another. Hereby, inasmuch as the elevation in question is disposed in the region of the duct-like connection, a kind of ridge may be advantageously realized that makes the cross-sectional area of the duct-like connection smaller on the pilot-stage housing side and thus reduces the flow cross section. Such an elevation or ridge formed by such an elevation may therefore contribute to reduction of the height of the control-pressure region, wherewith—especially in the region of the duct-like connection—the flow cross section can be influenced selectively.

Moreover, within the scope of the present disclosure, it proves to be particularly advantageous when the surface of the pilot-stage housing turned toward the power-stage housing is constructed on a distributor plate, which together with a base member forms the pilot-stage housing. Hereby, any grooves and/or elevations or ridges mentioned above and provided in the specific application situation may be formed on the said distributor plate and if necessary be configured differently for various valve groups, without the need for other changes on the housing of the valve group for this purpose. Moreover, the at least one sealing element could also be molded onto the distributor plate if necessary.

Furthermore, it proves advantageous that such a distributor plate—adapted to the desired switching behavior of the valve group or influencing it—may be made simply as an injection-molded part of plastic, wherein any grooves, elevations or ridges to be formed on the distributor plate, or other cross-sectional variations for the control-pressure region, can be realized particularly simply and inexpensively by use of various die inserts in the injection-molding die.

Preferably, at least one piezoelectric pilot valve is received in the pilot-stage housing. Particularly rapidly switching and precisely activatable valve groups of the can be realized with piezoelectric pilot valves. Obviously, inasmuch as the valve group comprises several pilot valves, preferably all electropneumatic pilot valves are then configured as piezoelectric pilot valves.

It is further advantageous when the compressed-air supply of the at least one pilot valve is routed through the separating face. Hereby a compressed-air port, provided on the power-stage housing, via which the power valves of the valve group are supplied with compressed air, may also be used simultaneously to supply compressed air to the pilot valves.

Moreover, it is advantageous when a pressure regulator for the compressed-air supply of the at least one pilot valve is integrated in the pilot-stage housing and/or power-stage housing. With such a pressure regulator, which is known as such from the prior art, a stable pressure (which is reduced compared with the pressure needed at the power valves) may be made available at the inlet of the at least one pilot valve.

A further preferred configuration of the present disclosure provides that (at least) one diaphragm, which on its side turned toward the pilot-stage housing bounds the control-pressure region and on which, on its opposite side (in the region of the two activation regions), valve bodies of the two associated power valves bear, is disposed on the surface of the power-stage housing turned toward the pilot-stage housing. The valve bodies of the power valves, which for this purpose are preferably coupled or joined mechanically with the diaphragm, are therefore then actuated in such a way that the control pressure supplied by the associated pilot valve causes a deflection of the diaphragm and of the valve body bearing thereon, whereby the said valve bodies—depending on the current switched stage of the valve—may in particular be lifted from a sealing seat and/or pushed against a sealing seat.

In a particularly expedient configuration of the valve group, it may be provided in a valve group that exactly two pilot valves and four power valves are provided, wherein two power valves are activated by each pilot valve via one control-pressure region each. In this connection, it proves further advantageous when the four power valves are disposed in overhead view on the separating face substantially at the corners of a square, wherein the power valves respectively disposed diametrically opposite one another are coupled with one another, i.e. are advantageously switched by one and the same pilot valve. Obviously, two control-pressure regions (separated from one another) in total can then be provided (with two activation regions each and one duct-like connection each between the activation regions for coupling of two power valves) by suitable configuration of the at least one sealing element in the separating face.

Preferably, the two control-pressure regions to be formed for this purpose may be enclosed by one sealing element each or by one sealing element in total.

Furthermore, it may be advantageously provided in a valve group that the housing has at least four pneumatic ports in the form of two working outlets connected in pairs to the four power valves, one compressed-air inlet connected to two of the power valves and one vent connected to the two other power valves. By means of suitable fluid-conveying connections within the housing, the latter vent may be used simultaneously as a vent for the at least one pilot valve, although at least one separate vent port for the at least one pilot valve may also be provided alternatively on the pilot-stage housing.

Within the scope of the housing concept, which in any case comprises multiple pieces, it may be further provided preferably that the power-stage housing is constructed in two or three pieces, as will be explained in still further detail hereinafter on the basis of an exemplary embodiment.

Furthermore, it proves advantageous when the power valves are constructed as seat valves that can be moved against a sealing seat and/or lifted from a sealing seat. In contrast to slide valves, particularly low-leakage or zero-leakage operation of the valve group may be ensured hereby.

Furthermore, it may be preferably provided that the (entire—if applicable multi-piece) pilot-stage housing and the (entire—if applicable multi-piece) power-stage housing are respectively constructed as injection-molded parts of plastic, so that significant cost savings are ensured compared with conventional valve housings consisting of metal.

And, finally, it may also be advantageously provided that the power-stage housing has a separate housing part, which is provided at least with the compressed-air port and the pneumatic working outlets (to the port of the pneumatic working element to be actuated with the valve group).

BRIEF DESCRIPTION OF THE DRAWING

Exemplary embodiments of the invention will be explained in more detail hereinafter on the basis of the drawing, wherein.

DETAILED DESCRIPTION OF THE PREFERRED EMBODIMENTS

FIGS. 1-8 show various (partial) views or cross sections of an exemplary embodiment of a electropneumatic valve group 1, which comprises in total two pilot valves P1, P2 and four power valves L1a, L1b, L2a, L2b. Therein pilot valve P1 is used to actuate or switch a first pair of power valves L1a, L1b and pilot valve P2 is used to actuate or switch a second pair of power valves L2a, L2b, as will be explained in still more detail hereinafter.

Figure 1:
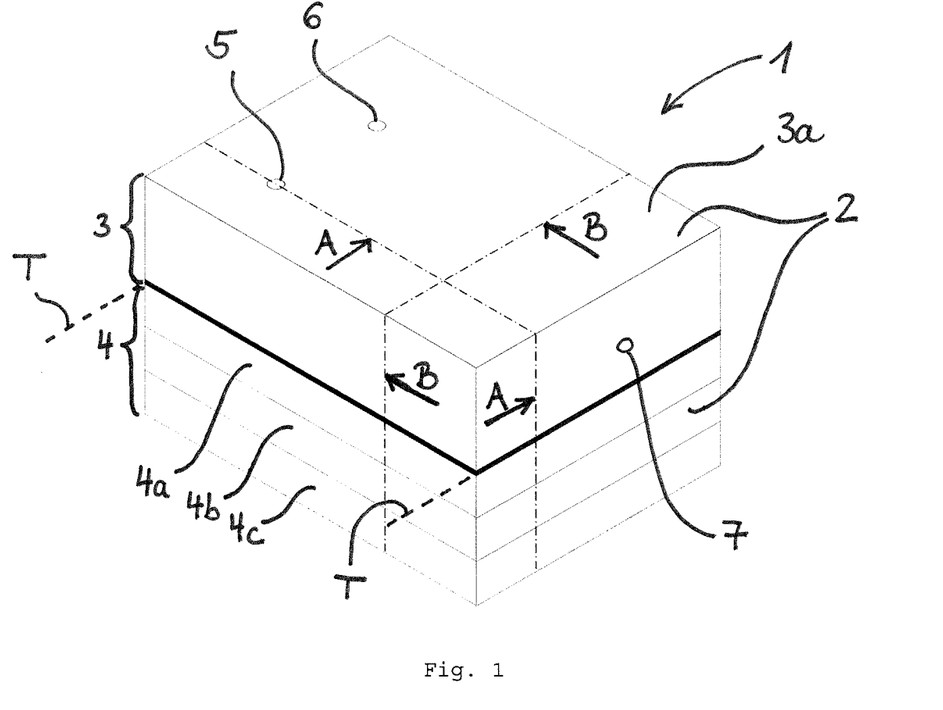
FIG. 1 shows a perspective view of the housing of an exemplary embodiment of a valve group.
Figure 7:
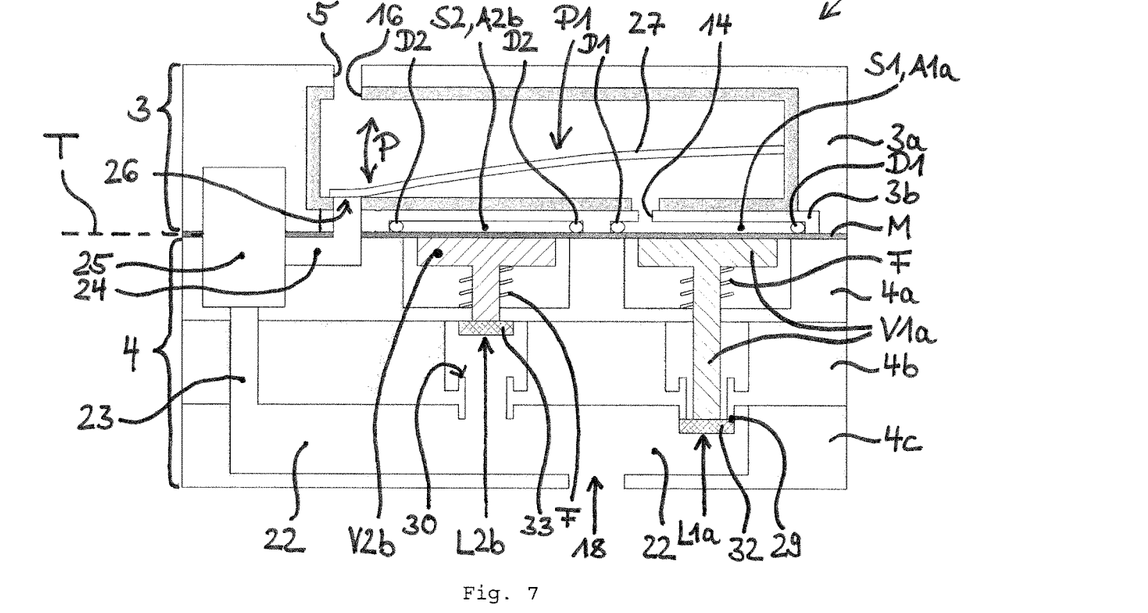
FIG. 7 shows a section through the valve group according to section line A-A from FIG. 1.
Figure 8:
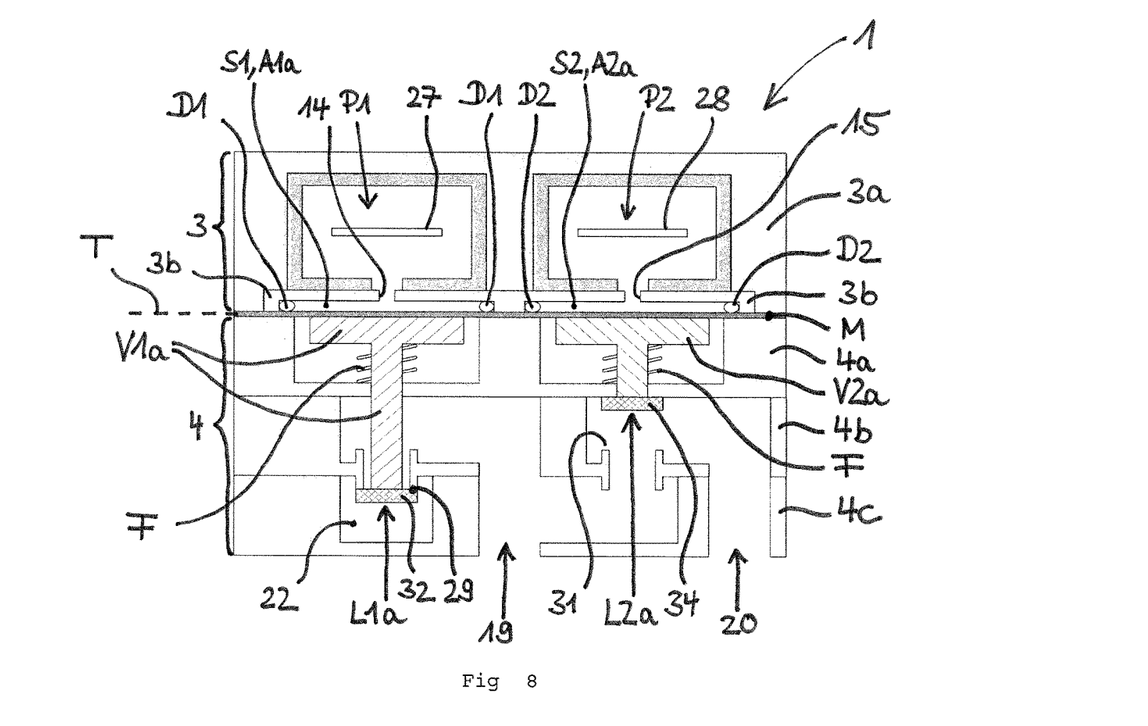
FIG. 8 shows a section through the valve group according to section line B-B from FIG. 1, FIGS. 9a-9b show two different variants for simple variation of the flow cross section of the duct-like connection in a valve group according to section line C-C from FIG. 4.

In the perspective representation of housing 2 of the exemplary embodiment of valve group 1 according to FIG. 1 and the sections according to FIGS. 7 and 8 (corresponding to section lines A-A and B-B from FIG. 1) through valve group 1, it can be readily seen that housing 2 of valve group 1 is constructed in layered manner from a pilot-stage housing 3 and a power-stage housing 4, wherein pilot-stage housing 3 and power-stage housing 4 are connected with one another along a substantially plane separating face T. Pilot-stage housing 3 and power-stage housing 4 are joined to one another in a suitable way (e.g. bolted to one another), but for better clarity this is not illustrated in the figures.

When FIG. 1 is viewed in conjunction with FIGS. 7 and 8, it can be further recognized that pilot-stage housing 3 and power-stage housing 4 for their part are respectively configured in multiple pieces. Of these, pilot-stage housing 3 comprises a base member 3a and a distributor plate 3b, turned with its lower surface toward power-stage housing 4, and together these form pilot-stage housing 3 serving to receive in total two pilot valves P1, P2.

On the upper side of pilot-stage housing 3, two vent openings or vent ports 5, 6 are provided for the two pilot valves P1 and P2 present therein. Furthermore, an electrical signal input 7 is provided on pilot-stage housing 3 for electrical or electronic activation of the two electropneumatic pilot valves P1 and P2 present therein.

Power-stage housing 4 is likewise configured in multi-piece and layered manner (with substantially plane separating faces) from in total three housing parts 4a, 4b, 4c, in which in total four power valves L1a, L1b, L2a, L2b are received. The pneumatic ports of valve group 1 leading to the various valves (with the exception of the two vent ports 5, 6 for the two pilot valves P1 and P2) are provided here on the lowest housing part 4c, as will be explained in still more detail hereinafter in connection with FIGS. 7 and 8.

For better understanding of the housing concept of the given exemplary embodiment of a electropneumatic valve group 1, FIGS. 2 to 6 respectively show only one part of housing 2 of valve group 1 illustrated in FIG. 1 during its successive assembly.

Figure 2:
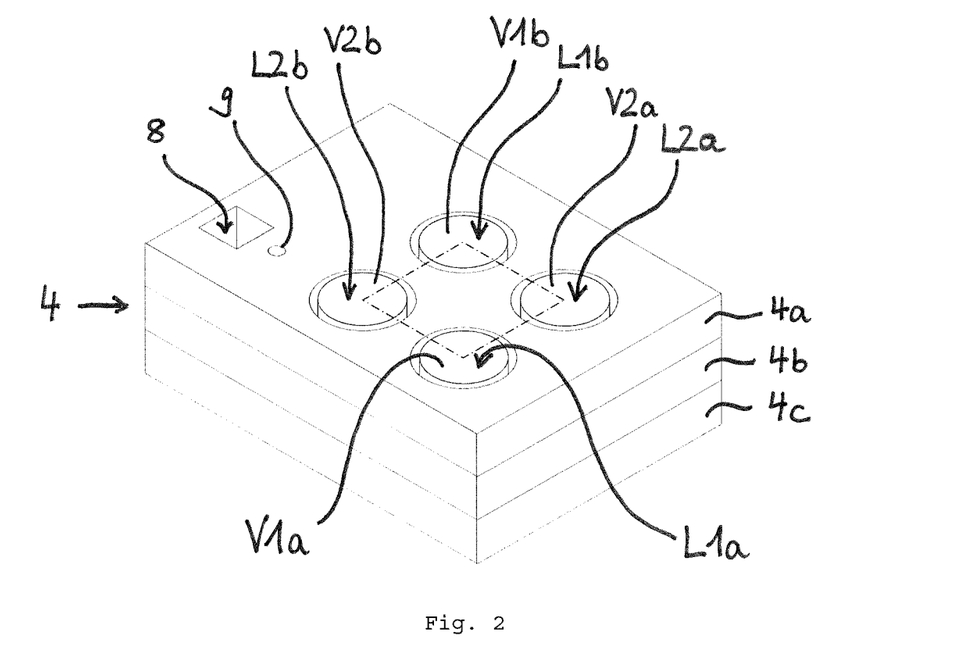
FIGS. 2-6 show various perspective views of parts of the valve group according to the exemplary embodiment from FIG. 1.
Figure 3:
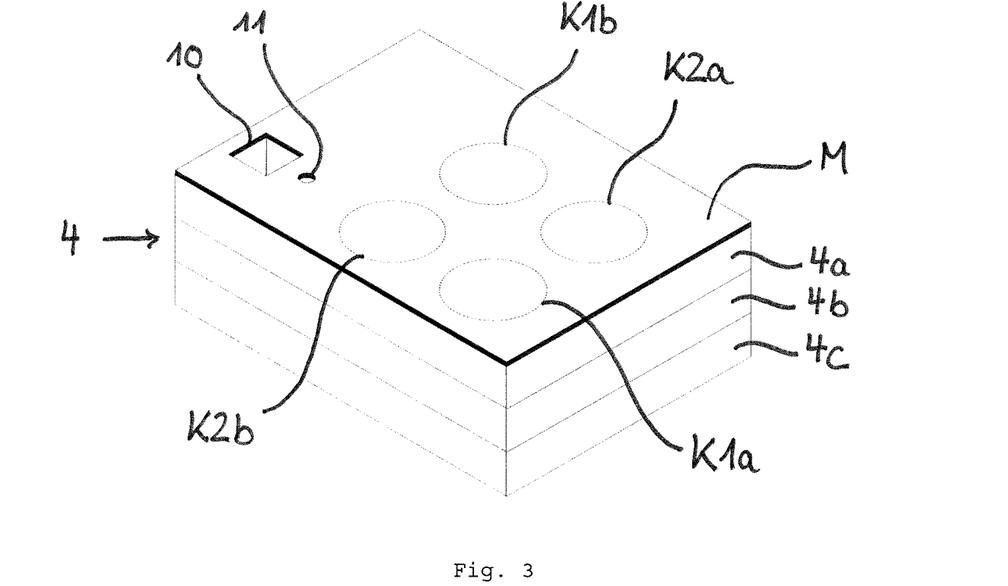

FIG. 2 shows exclusively power-stage housing 4 with in total four power valves L1a, L1b, L2a, L2b inserted therein and their valve bodies V1a, V1b, V2a, V2b, which are visible on the upper side of the housing. Rectangular recess 8 in uppermost housing part 4a of power-stage housing 4 is used to partly receive a pressure regulator, which will be explained in still more detail hereinafter on the basis of FIG. 7. Furthermore, in FIG. 2, a bore 9, through which the compressed air needed for the operation of pilot valves P1, P2 is supplied to them, is also visible in uppermost housing part 4a of the power-stage housing.

FIG. 3 once again shows power-stage housing 4, wherein, on its upper side, a diaphragm M is now disposed there that in the present case substantially covers the entire surface of power-stage housing 4 pointing toward pilot-stage housing 3 (not shown in FIG. 3) and which—in the inner region of the four circles K1a, K1b, K2a, K2b represented by dotted lines—bear with their underside on valve bodies V1a, V1b, V2a, V2b of the four power valves L1a, L1b, L2a, L2b and are mechanically joined thereto, so that diaphragm M can be deflected in this region (together with the respective valve body). In the region of the dotted circles K1a, K1b, K2a, K2b, diaphragm M may advantageously have a bead or a bulge-like structuring following the contour of the circle and/or may be clamped securely there (after assembly of the entire housing) with power-stage housing 4, so that a deflection of diaphragm M in the region of a valve body V1a, V1b, V2a, V2b has no influence on the rest of diaphragm M. Otherwise, diaphragm M in the present case has two recesses 10, 11, which correspond to recess 8 and bore 9 in uppermost housing part 4a of power-stage housing 4 (see FIG. 2).

Figure 4:
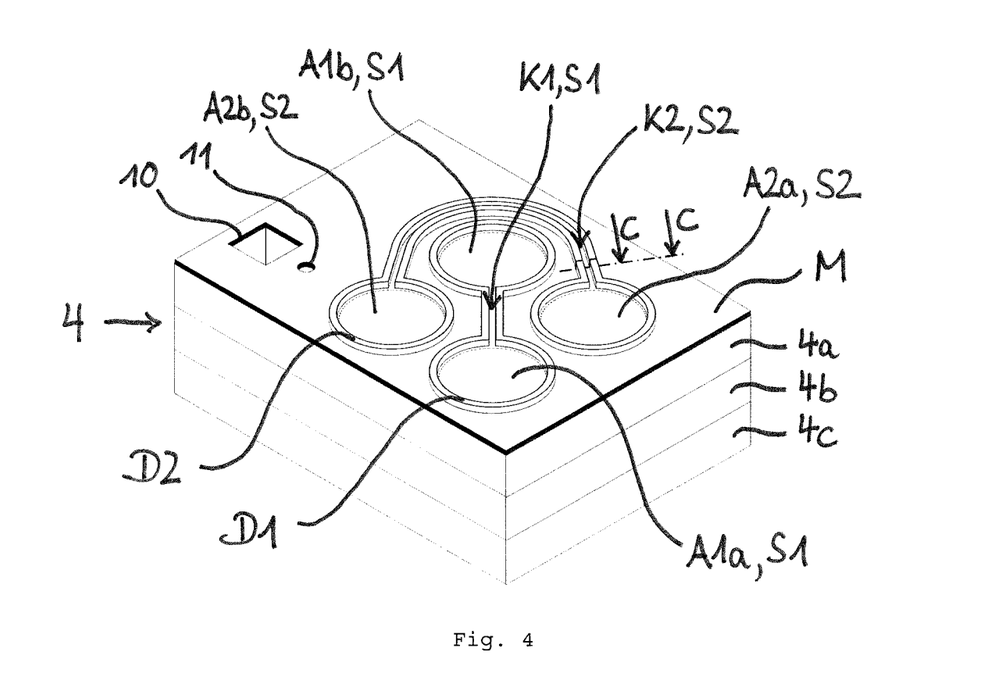

FIG. 4 in turn shows power-stage housing 4 with diaphragm M placed thereon, but now additionally two sealing elements D1 and D2 disposed on the diaphragm are disposed in the form of closed cord seals which—when housing 2 is completely assembled—each sealingly enclose or surround a control-pressure region S1, S2 laterally. Each of these control-pressure regions S1 or S2 is formed by two activation regions A1a, A1b or A2a, A2b and each by duct-like connections K1 or K2 placing the two activation regions A1a and A1b or A2a and A2b in communication with defined flow cross section. Each of these activation regions A1a, A1b, A2a, A2b is associated with a power valve L1a, L1b, L2a, L2b each, as is indicated by the reference symbols corresponding to one another in their structural diagram.

The two control-pressure regions S1 and S2, which can each be pressurized with a control pressure by an electropneumatic pilot valve P1, P2 and which are formed between power-stage housing 4 and pilot-stage housing 3, are therefore bounded on the power-stage housing side by the surface (pointing toward the pilot-stage housing) of diaphragm M in the completely assembled valve group 1 and are laterally surrounded by the respective sealing element D1 or D2. On the pilot-pressure housing side, the respective control-pressure region S1 and S2 is bounded by the surface of pilot-stage housing 3 that points toward power-stage housing 4.

In the present exemplary embodiment of the valve group, diaphragm M extends to the lateral rim of uppermost housing part 4a of power-stage housing 4, although this is by no means imperative. To the contrary, in terms of its area extent, diaphragm M may also be set back from the lateral rim, in order to facilitate establishing the connection of pilot-stage housing 3 to power-stage housing 4 advantageously in the rim region. Basically, it is even sufficient when diaphragm M is provided exclusively in the region of the two control-pressure regions S1, S2, so that in principle two individual diaphragms could also be provided in the said regions.

Figure 5:
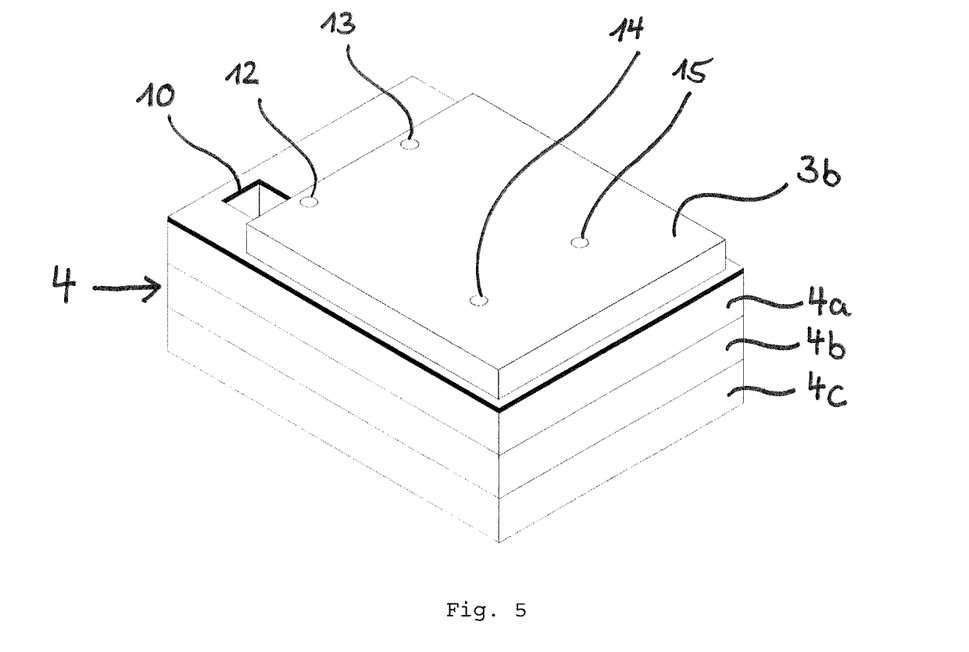

FIG. 5, in which the part of housing 2 of the valve group 1 illustrated in FIG. 4 has been supplemented by a distributor plate 3b, shows that the two control-pressure regions S1, S2 are finally bounded at the top by a distributor plate 3b, which in turn represents a part of pilot-stage housing 3, as is even more clearly shown in FIGS. 7, 8, 9a and 9b. The upper side of distributor plate 3b is perforated in the present case by in total four bores 12, 13, 14, 15, of which bores 12, 13 shown further to the left in FIG. 5 are used for the pressure supply of pilot valves P1, P2, whereas bores 14, 15 shown further to the right are each associated with a pilot valve P1, P2 and represent pilot-stage housing-side outlets of the respective pilot valve P1, P2, each of which discharges—with its end pointing toward power-stage housing 4—into one of the two control regions S1, S2 (in the present case in the region of activation regions A1a and A2a).

Figure 6:
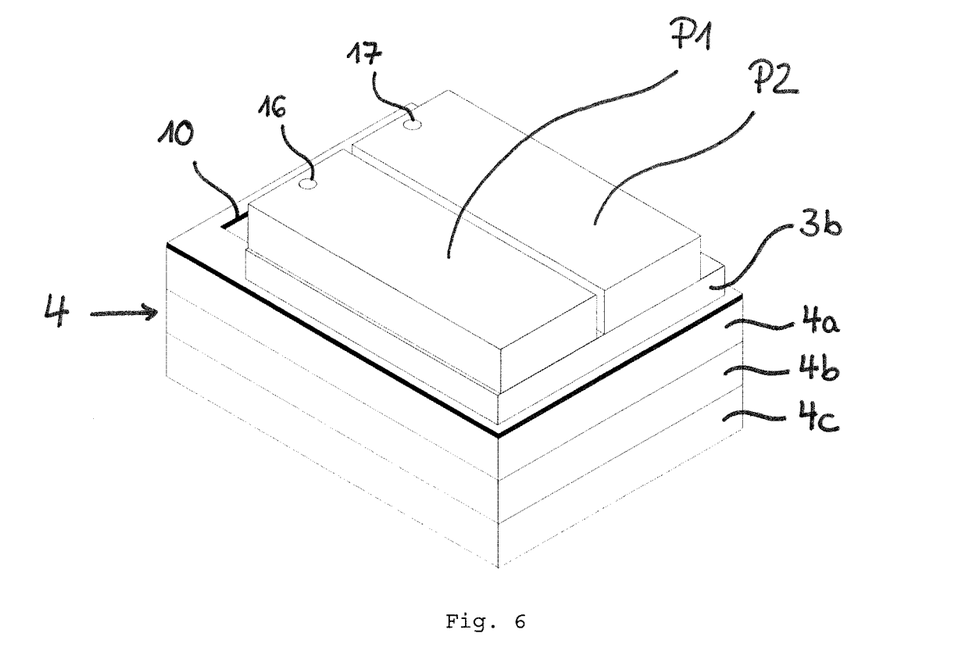

In FIG. 6, pilot-stage valves P1, P2 disposed directly above distributor plate 3b are further added. On its upper side, these each have a vent opening 16, 17, which correspond to and are aligned with vent openings 5, 6, already shown in FIG. 1, in the upper side of base body 3a of pilot-stage housing 3. If base body 3a of pilot-stage housing 3 is now also mounted, then the valve group 1, the functional principle of which will be explained in still more detail hereinafter on the basis of the further figures, is completed, as already illustrated in FIG. 1.

FIGS. 7 and 8 show two sectional diagrams through the exemplary embodiment, already described on the basis of FIGS. 1 to 6, of a valve group 1 according to section lines A-A and B-B from FIG. 1.

From FIGS. 7 and 8 it is apparent that a compressed-air port 18 (FIG. 7), a first working port 19 (FIG. 8) and a vent port 20 (FIG. 8) are provided on the lowest housing part 4c of power-stage housing 4 in the form of suitable housing openings of pneumatic ports.

In the present case, this compressed-air port 18, as is apparent from FIG. 7, is connected to the two power valves L1a and L2b illustrated in FIG. 7, i.e. is in fluidic communication with these by suitable duct routing within power-stage housing 4.

In the present case, first working outlet 19 is connected to the two power valves L1a and L2a illustrated in FIG. 8. Furthermore, a second working outlet 21 (shown only schematically in the pneumatic circuit diagram according to FIG. 10), which in comparable arrangement is interconnected with the two power valves L1b and L2b not illustrated in FIG. 8, is further provided on the lowest housing part 4c.

The said power valves L1a and L2b are therefore able—depending on switched state—to place the respective working outlet associated with them optionally in communication with the compressed-air port or to disconnect them from it. In contrast, the two further power valves L1b and L2a are connected to vent port 20, and so are able to place the respective working outlet associated with them optionally in communication with the vent or to disconnect them from it.

Beyond this, the compressed air supplied at compressed-air port 18, which for conventional pneumatic applications may have a pneumatic pressure of 6 bar, for example, is furthermore passed via duct structure 22, 23, 24, in which a pressure regulator 25 is also installed, to compressed-air inlet 26 of first pilot valve P1. Analogously, the compressed-air inlet—not illustrated—of second pilot valve P2 is also supplied with the compressed air introduced via compressed-air port 18 and pressure regulator 25.

Thus the two power valves L1a, L2b illustrated in FIG. 7 and the two pilot valves P1 and P2—via pressure regulator 25 connected in between—are connected simultaneously to the single compressed-air port 18 of valve group 1.

In the present exemplary embodiment of the valve group, the two pilot valves P1, P2 are configured as piezoelectric valves that can be switched particularly rapidly and precisely with a piezo bending transducer 27, 28, the free end of which can be swiveled (by means of an electrical voltage) according to double arrow P (see FIG. 7) in such a way that compressed-air inlet 26 of the respective pilot valve P1, P2 or vent opening 16, 17 of the respective pilot valve P1, P2 can be optionally closed or released, whereby the outlet 14, 15, provided on pilot-stage housing 3, of the respective pilot valve P1, P2, each of which discharges into one of the two control regions S1, S2, can be optionally vented or supplied with compressed air for switching of the associated power valves L1a, L1b or L2a, L2b.

Power valve L1a illustrated at the right in FIG. 7 and power valve L1b, not illustrated in FIGS. 7 and 8, both of which are associated with pilot valve P1 illustrated in FIG. 7 and are switched by it, are both configured as "normally closed" valves, i.e. in the non-switched state (i.e. with vented control-pressure region S1) they disconnect compressed air inlet 18 (valve L1a) or the vent (valve L1b) from working outlet 19 or 21 associated with the respective valve.

In contrast, power valve L2b illustrated at the left in FIG. 7 and power valve L2a illustrated at the right in FIG. 8 are configured as "normally open" valves, i.e. in the non-switched state (i.e. with vented control-pressure region S2) they permit communication between the compressed air inlet (valve L2b) or vent 20 (valve L2a) and working outlet 21 or 19 associated with the respective valve.

Each power valve L1a, L1b, L2a, L2b is provided in the present case with a valve body V1a, V1b, V2a, V2b, which is biased by means of a spring F linearly guided movably in the direction of the activation region A1a, A1b, A2a, A2b, and the upper side of which on the activation-region side is coupled with the diaphragm M present there. Thus, if the control pressure in the activation region A1a, A1b, A2a, A2b in question is now raised above the actuation threshold by means of the respective pilot valve P1, P2, the valve body in question is deflected together with the diaphragm from its respective home position.

Upon this actuation, the "normally closed" power valves L1a and L1b (the latter is not illustrated in FIGS. 7 and 8) are lifted from a sealing seat 29, whereupon the working outlet associated with the respective valve is placed in communication with the compressed-air port or the vent port. Upon their actuation, "normally open" power valves L2a and L2b are pushed out of their home position against a sealing seat 30, 31, so that they then block the communication that previously still existed between the vent port and the respective working outlet. On each valve body V1a, V1b, V2a, V2b of power valves L1a, L1b, L2a, L2b in the present case, a sealing face 32, 33, 34 of an elastomeric material interacting with the respective sealing seat 29, 30, 31 is provided, with which a particularly low leakage of power valves L1a, L1b, L2a, L2b is achieved.

It can be further readily seen in FIGS. 7 and 8 that the communication on the pilot-stage housing side between the respective pilot valve P1, P2 with the control region S1, S2 associated with it through the respective bore 14, 15 in distributor plate 3b is particularly short in the present case, since pilot valves P1, P2 are disposed directly above the respective discharge into control-pressure region S1, S2. In the given example, the outlet of first pilot valve P1 discharges into activation region A1a of power valve L1a illustrated on the right in FIG. 7 and on the left in FIG. 8. That of second pilot valve P2 discharges into activation region A2a of power valve L2b illustrated on the right in FIG. 8. Hereby an asymmetric discharge into the respective control region S1, S2 is created.

In the case of a suitable switched state, the compressed air supplied by the respective pilot valve P1, P2 flows further from the respective activation region A1a or A2a via a duct-like connection K1 or K2 each, which is provided in the control-pressure region S1 or S2 in question (see FIG. 4) and is bounded laterally by sealing element D1 or D2 disposed between pilot-stage housing 3 and power-stage housing 4, further to the respective second activation region A1b or A2b of the control-pressure region S1 or S2 in question. The predeterminable flow cross section defined simply by the specific shape of this duct-like connection K1, K2 and the flow-restricting effect that can be adjusted hereby then permit simple and selective matching of the switching times of the respective power valves L1a, L1b, L2a, L2b.

Figure 9A:
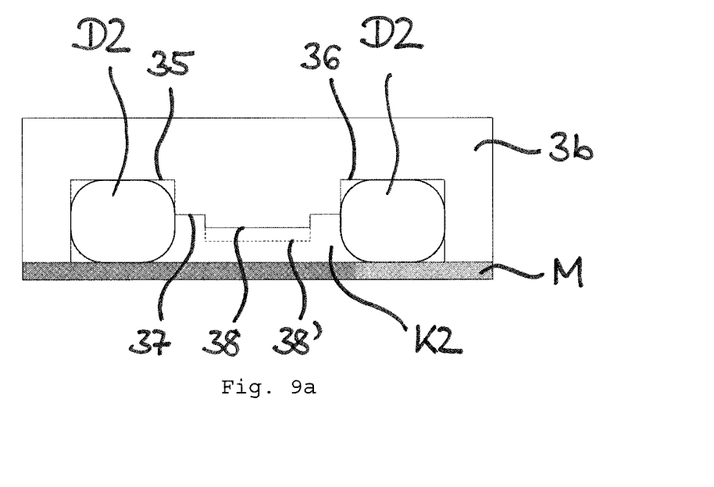
Figure 9B:
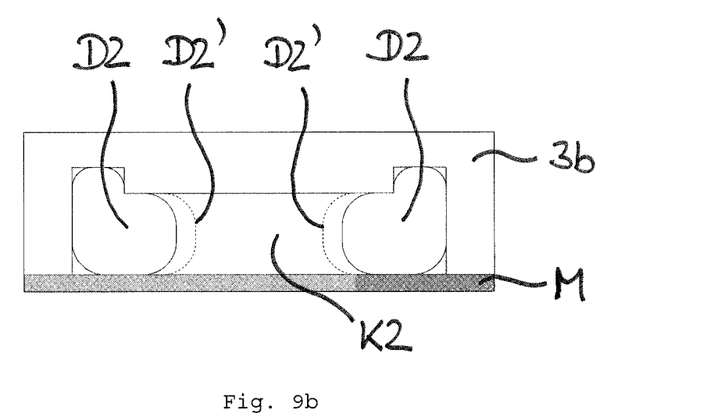

FIGS. 9a and 9b respectively show a cross section through duct-like connection K2 from FIG. 4 according to section line C-C therein in two different construction variants. As already explained several times, duct-like connection K2 according to the exemplary embodiments of FIGS. 9a and 9b are bounded at the bottom by diaphragm M and at the top by distributor plate 3b. They are bounded laterally by sealing element D2, which laterally encircles the entire control-pressure region S2 including the two activation regions A2a, A2b (see FIG. 4).

In the variant according to FIG. 9a, two grooves 35, 36 that (partly) receive sealing element D2, which is constructed as a cord seal, are provided in the distributor plate, wherein an elevation 38 (as a ridge running along the duct-like connection) is provided in region 37 between the two grooves 35, 36. By variation of the height of this elevation, as illustrated by variant 38', the flow cross section of duct-like connection K2 and thus the switching times of the associated power valves can therefore be changed in simple manner. In the case of a distributor plate 3b made from plastic in an injection-molding process, corresponding variations may be realized simply by a correspondingly variable die insert in the injection-molding die in question, without the need for new injection-molding molds for the purpose.

In the variant according to FIG. 9b, simply the size or the diameter of sealing element D2 or D2' clamped between distributor plate 3b and diaphragm M is varied, wherewith the flow cross section of the duct-like connection is likewise variable in simple manner.

Figure 10:
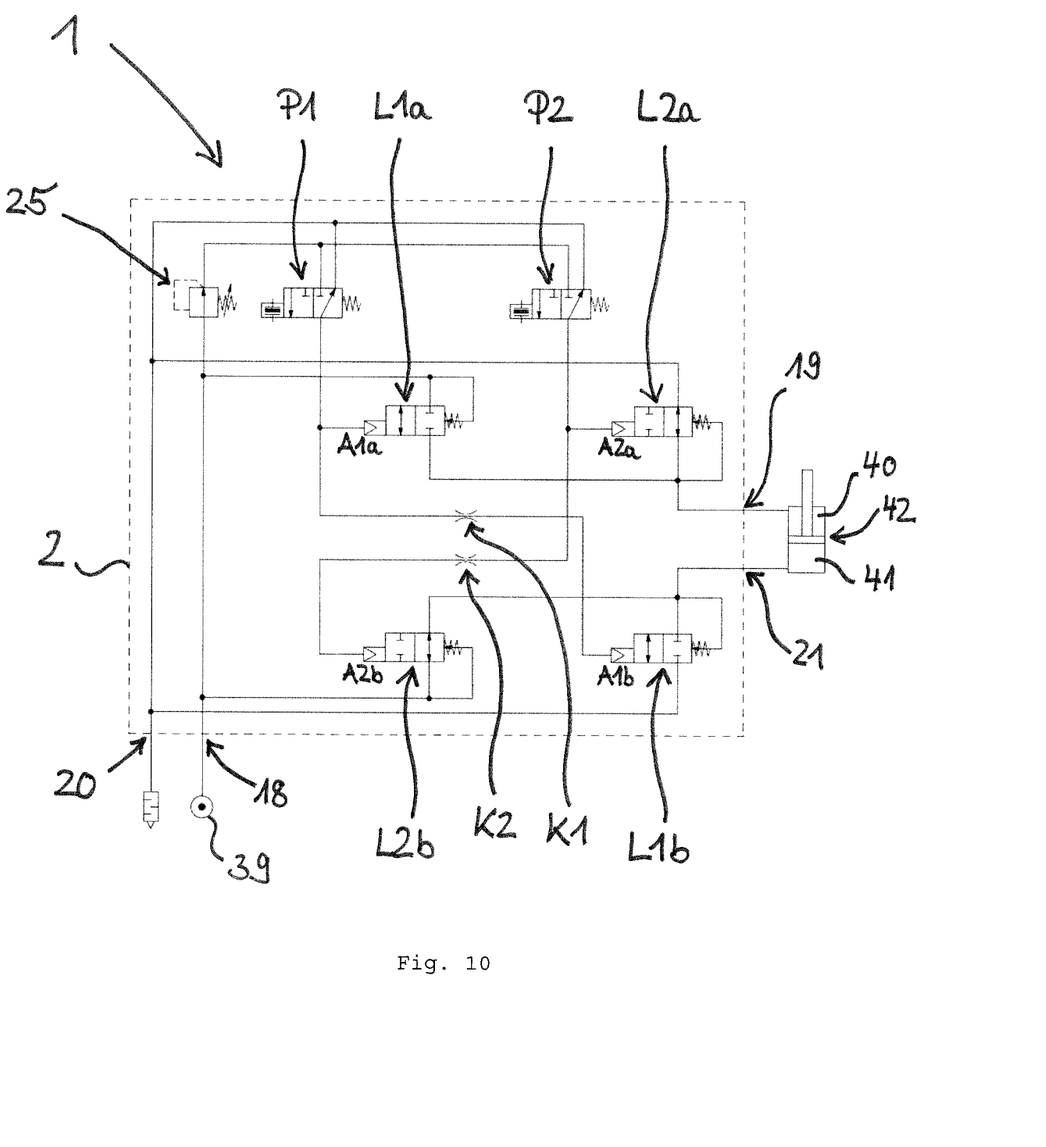
FIG. 10 shows a pneumatic circuit diagram of an exemplary embodiment of a valve group.

Finally, FIG. 10 further shows a pneumatic circuit diagram of an exemplary embodiment of a valve group 1, in which the compressed air arriving from a compressed-air supply 39 is connected to compressed-air port 18 of valve group 1. This compressed air is passed to the two power valves L1a and L2b illustrated on the left and also—via a pressure regulator 25—to the two electrically or electronically activatable pilot valves P1 and P2. Furthermore, a vent port 20 is provided, to which the two remaining power valves L2a and L1b are connected, wherein—in a slight modification of the exemplary embodiment of the valve group explained in the foregoing—pilot valves P1 and P2 are also coupled with the common vent port 20 in the present case. The outlets of each two power valves L1a, L2a and L2b, L1b are respectively in fluidic communication and form a first working outlet 19 and a second working outlet 21 of valve group 1.

In this case, first working outlet 19 is in communication with a first drive chamber 40 and second working outlet 21 with a second drive chamber 41 of a pneumatic drive or working element 42 to be actuated by means of valve group 1.

In the given example, the pneumatic communication of pilot valves P1, P2 with power valves L1a, L1b or L2a, L2b respectively switched by them takes place by the fact that the respective outlet of pilot valve P1, P2 first discharges into an activation region A1a or A2a associated with a first power valve L1a, L2a, wherein the compressed air passes from there via duct-like connection K1 or K2 configured according to the disclosure (which generates a flow-restricting effect) to activation region A2a or A2b of second power valve L1b or L2b switched by pilot valve P1, P2 in question.

In the home position, known as the fail-safe state, drive chamber 40 is vented and drive chamber 41 is pressurized by the specific arrangement of the four power valves L1a, L1b, L2a, L2b. This position differs from the normal position of the valve during operation. In that case, drive 42 is first moved to its nominal position by appropriate activation of pilot valves P1, P2. Then a hold state is set, in which pilot valve P1 remains in the normal state and pilot valve P2 is switched. Thereby valves L1a and L1b are situated in their normal position, while valves L2a and L2b are in their switched position.

The structure of the power valves is configured such that the respective pressure at the inlet there acts in restoring manner on the valve. For valves L1a and L2b, this pressure is respectively the supply pressure, and therefore 6 bar, for example. For valves L2a and L1b, this pressure is the chamber pressure that respectively prevails in the drive, and that may lie between 0 and 6 bar.

From the viewpoint of regulation technology, it is advantageous in this application situation when all power valves have the same switching times. Thus a change of switched state of the pilot valves should preferably cause an identically rapid change of the switched state at all four power valves. In particular, the change of the switched state of power valves L1a and L1b should advantageously take place exactly as rapidly as that of power valves L2a and L2b also.

Here, if it is not possible to influence the switching times of the various valves simply as described, the construction of the power valves acts negatively, as will be explained here by way of example with respect to power valves L1a and L1b. In the normal state during operation, the supply pressure acts in supporting manner on valve L1a. In order to actuate this valve, therefore, both the force caused hereby and that of spring F acting in restoring manner must be overcome. In contrast, a typically smaller force acts on valve L1b, namely only the spring force as well as the force generated by the chamber pressure. Correspondingly, this valve is normally already actuated at a lower pressure. In order to compensate for this discrepancy, it is therefore advantageous to realize a control-pressure region in which a duct-like connection with defined flow cross section is provided between two activation regions (associated with various power valves). Herewith a flow-restricting effect can be generated, namely for pneumatic action of power valve L1b, for example. This delays the pressure rise in activation region A1b associated with power valve L1b compared with the pressure rise in activation region A1a associated with power valve L1a. Correspondingly, this feature leads to equalization of the switching times.

In the case of valves L2a and L2b, the behavior in the given exemplary embodiment is presented as follows. In the normal operating state, both valves are switched. In this switched state, both the chamber pressure and the spring restoring force act in opposition on valve L2a. In contrast, the full supply pressure as well as the spring restoring force act on valve L2b. Correspondingly, valve L2b already switches again at a smaller pressure drop in the activation region associated with it, since a larger opposing force acts in restoring manner here. There also, therefore, equalization of the switching times can be achieved by delaying the time of the pressure drop by means of the flow restrictor that can be generated in simple manner.

A valve group as described exhibits high flexibility on the whole, in order to adapt the switching times of the various power valves to the respective given application situation.

What is claimed is:

1. An electropneumatic valve group (1), comprising:
   an electropneumatic pilot stage with at least one pilot valve (P1, P2) and
   a pneumatic power stage, activated by the pilot stage, with at least two power valves (L1a, L1b, L2a, L2b),
   wherein each pilot valve (P1, P2) switches at least two power valves (L1a, L1b; L2a, L2b) coupled pneumatically with the pilot valve (P1, P2) and
   wherein the valve group (1) is provided with a housing (2) having an electrical signal input (7), a compressed-air port (18), at least one vent port (20) and at least one working outlet (19, 21),
   wherein the housing (2) has a layered structure with at least one pilot-stage housing (3) and at least one power-stage housing (4) connected thereto along a substantially plane separating face (T),
   wherein at least one sealing element (D1, D2), which encloses a control-pressure region (S1, S2) disposed between the at least one pilot-stage housing (3) and the at least one power-stage housing (4), is received or formed between the at least one pilot-stage housing (3) and the at least one power-stage housing (4), wherein the control-pressure region (S1, S2) is provided with two activation regions (A1a, A1b; A2a, A2b) for the at least two power valves (L1a, L1b; L2a, L2b) and one duct-like connection (K1; K2) with a defined flow cross section between the two activation regions (A1a, A1b; A2a, A2b), wherein an outlet (14, 15) of the associated pilot valve (P1, P2) provided in the pilot-stage housing (3) discharges into the control-pressure region (S1, S2),
   wherein the at least one sealing element (D1, D2) is constructed as a closed cord seal, which laterally encircles the control-pressure region (S1, S2),
   the surface of the pilot-stage housing (3) turned toward the power-stage housing (4) has grooves (35, 36) that receive the cord seal, and
   elevations (38, 38') are formed on the surface of the pilot-stage housing (3) turned toward the power-stage housing (4), between the two grooves (35, 36) adjacent to one another.

2. The valve group of claim 1, wherein the outlet (14, 15) of the pilot valve (P1, P2) discharges in asymmetric arrangement into the control-pressure region (S1, S2).

3. The valve group of claim 2, wherein the outlet (14, 15) of the pilot valve (P1, P2) discharges into one of the activation regions (A1a, A1b; A2a, A2b) of the control-pressure region (S1, S2) associated with the pilot valve (P1, P2).

4. The valve group of claim 1, wherein the surface of the pilot-stage housing (3) turned toward the power-stage housing (4) is constructed on a distributor plate (3b), which together with a base member (3a) forms the pilot-stage housing (3).

5. The valve group of claim 4, wherein at least one piezoelectric pilot valve (P1, P2) is received in the pilot-stage housing (3).

6. The valve group of claim 1, wherein the compressed-air supply of the at least one pilot valve (P1, P2) is routed through the separating face (T).

7. The valve group of claim 1, wherein a pressure regulator (25) for the compressed-air supply of the at least one pilot valve (P1, P2) is integrated in the pilot-stage housing and/or power-stage housing (3 or 4).

8. The valve group of claim 1, wherein a diaphragm (M), which on its side turned toward the pilot-stage housing (3) bounds the control-pressure region (S1; S2) and on which, on its opposite side, valve bodies (V1a, V1b; V2a, V2b) of the two associated power valves (L1a, L1b; L2a, L2b) bear, is disposed on the surface of the power-stage housing (4) turned toward the pilot-stage housing (3).

9. The valve group of claim 1, wherein exactly two pilot valves (P1, P2) and four power valves (L1a, L1b, L2a, L2b) are provided, wherein two power valves (L1a, L1b, L2a, L2b) are activated by each pilot valve via one control-pressure region each.

10. The valve group of claim 9, wherein the four power valves (L1a, L1b, L2a, L2b) are disposed in overhead view on the separating face (T) substantially at the corners of a square, wherein the respective power valves (L1a, L1b, L2a, L2b) disposed diametrically opposite one another are coupled with one another.

11. The valve group of claim 9, wherein the two control-pressure regions (S1, S2) are enclosed by one sealing element (D1, D2) each or by one sealing element in total.

12. The valve group of claim 9, wherein the housing (2) has at least four pneumatic ports in the form of
   two working outlets (19, 21) connected in pairs to the four power valves (L1a, L1b, L2a, L2b),
   one compressed-air inlet (18) connected to two of the power valves (L1a, L2b) and
   one vent (20) connected to the two other power valves (Lib, L2a).

13. The valve group of claim 1, wherein the power-stage housing (4) is of two-piece or three-piece construction.

14. The valve group of claim 1, wherein the power valves (L1a, L1b, L2a, L2b) are constructed as seat valves that can be moved against a sealing seat (30, 31) and/or lifted from a sealing seat (29).

15. The valve group of claim 1, wherein the pilot-stage housing (3) and the power-stage housing (4) are respectively constructed as injection-molded parts of plastic.

16. The valve group of claim 1, wherein the power-stage housing (4) has a separate housing part (4c), which is provided with at least the compressed-air port (18) and the pneumatic working outlets (19, 21).

\* \* \* \* \*

UNITED STATES PATENT AND TRADEMARK OFFICE
CERTIFICATE OF CORRECTION

Page 1 of 1

PATENT NO. : 10,619,655 B2
APPLICATION NO. : 16/158559
DATED : April 14, 2020
INVENTOR(S) : György Molnar et al.

It is certified that error appears in the above-identified patent and that said Letters Patent is hereby corrected as shown below:

On the Title Page

The Applicant is indicated as "HOERBIGER AUTOMATISIERUNGSTECHNIK HOLDING GMBH (DE)" and should instead read:
--HOERBIGER FLOW CONTROL GMBH, ALTENSTADT (DE)--

The Assignee is indicated as "HOERBIGER AUTOMATISIERUNGSTECHNIK HOLDING GMBH (DE)" and should instead read:
--HOERBIGER FLOW CONTROL GMBH, ALTENSTADT (DE)--

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*